United States Patent
Lee et al.

(10) Patent No.: US 9,382,940 B2
(45) Date of Patent: Jul. 5, 2016

(54) TRIPLE RACE ANGULAR CONTACT BEARING

(71) Applicant: Schaeffler Technologies AG & Co. KG, Herzogenaurach (DE)

(72) Inventors: Brian Lee, York, SC (US); Carsten Ohr, Charlotte, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/694,054

(22) Filed: Apr. 23, 2015

(65) Prior Publication Data

US 2015/0323003 A1    Nov. 12, 2015

Related U.S. Application Data

(60) Provisional application No. 61/991,664, filed on May 12, 2014.

(51) Int. Cl.
| | |
|---|---|
| *F16C 19/18* | (2006.01) |
| *F16C 19/54* | (2006.01) |
| *F16C 19/55* | (2006.01) |
| *F16C 33/58* | (2006.01) |
| *F16C 33/38* | (2006.01) |

(52) U.S. Cl.
CPC .............. *F16C 19/181* (2013.01); *F16C 19/542* (2013.01); *F16C 19/55* (2013.01); *F16C 33/3825* (2013.01); *F16C 2226/12* (2013.01); *F16C 2226/36* (2013.01); *F16C 2240/80* (2013.01)

(58) Field of Classification Search
CPC .......... F16C 19/54; F16C 19/55; F16C 33/38; F16C 2326/06; F16C 2226/12; F16C 2226/36; F16C 2240/80; F16C 33/3825; B60B 27/0005
USPC ......... 384/461, 470, 490, 513, 516, 523, 579, 384/504

See application file for complete search history.

(56) References Cited

U.S. PATENT DOCUMENTS

| | | | | |
|---|---|---|---|---|
| 1,433,014 A | * | 10/1922 | Kennedy ............. | B60B 27/0005 384/461 |
| 1,769,933 A | * | 7/1930 | Arutunoff ............... | F16C 19/55 384/613 |
| 3,011,364 A | * | 12/1961 | Mims ...................... | F16C 19/55 384/461 |
| 3,737,202 A | * | 6/1973 | Rosales .................... | F16C 19/55 384/461 |
| 4,045,100 A | * | 8/1977 | Beauchet ................ | F16C 19/38 384/461 |
| 4,643,047 A | * | 2/1987 | Distin ..................... | F16H 25/06 475/168 |

(Continued)

FOREIGN PATENT DOCUMENTS

GB            150278 A   *   4/1921   .............. F16C 19/10

*Primary Examiner* — Marcus Charles
(74) *Attorney, Agent, or Firm* — Volpe and Koenig, P.C.

(57) ABSTRACT

A rolling bearing assembly including an intermediate bearing ring is provided. The rolling bearing assembly includes an inner bearing ring including at least one axial end configured to be supported on a first component, and an outer bearing ring including at least one axial end configured to be supported on a second component. The intermediate bearing ring is arranged between the inner bearing ring and the outer bearing ring and includes at least one axial end configured to be supported on a third component. The at least one axial end of the intermediate bearing ring extends in an axial direction past at least one of the at least one axial end of the inner bearing ring or the at least one axial end of the outer bearing ring.

7 Claims, 4 Drawing Sheets

(56) References Cited

U.S. PATENT DOCUMENTS

| | | | | |
|---|---|---|---|---|
| 4,664,539 A * | 5/1987 | Li | ............................ | F16C 19/55 384/102 |
| 5,820,272 A * | 10/1998 | Nashiki | .............. | B23Q 11/0003 384/461 |
| 6,741,428 B1 * | 5/2004 | Oveyssi | ................... | F16C 19/54 360/265.6 |
| 8,292,509 B2 * | 10/2012 | Montagu | ................. | F01D 25/16 384/453 |
| 8,480,532 B2 | 7/2013 | Biermann et al. | | |
| 8,630,062 B2 * | 1/2014 | Shimizu | .................. | F16C 19/56 384/504 |
| 8,646,982 B2 * | 2/2014 | Radinger | ................. | F16C 19/55 384/461 |
| 2008/0089629 A1 | 4/2008 | Seo et al. | | |
| 2008/0232731 A1 * | 9/2008 | Venter | .................... | F16C 33/306 384/517 |
| 2009/0081040 A1 * | 3/2009 | Ueno | ....................... | F16C 19/55 384/461 |
| 2009/0310899 A1 * | 12/2009 | Magami | ................... | F16C 13/02 384/586 |
| 2010/0202721 A1 | 8/2010 | Fukuda et al. | | |
| 2011/0069917 A1 | 3/2011 | Yamada et al. | | |
| 2011/0255820 A1 | 10/2011 | Caspall et al. | | |
| 2012/0141058 A1 | 6/2012 | Radinger et al. | | |

* cited by examiner

TRIPLE RACE ANGULAR CONTACT BEARING

INCORPORATION BY REFERENCE

The following documents are incorporated herein by reference as if fully set forth: U.S. Provisional Patent Application No. 61/991,664, filed May 12, 2014.

FIELD OF INVENTION

The present invention relates to an angular contact rolling bearing assembly, and in particular to an angular contact rolling bearing assembly with an intermediate bearing ring.

BACKGROUND

Angular contact rolling bearing assemblies are used in various mechanical applications. One known type of angular contact rolling bearing includes an outer bearing ring, an inner bearing ring, and an intermediate bearing ring defining two races on opposite sides. These angular contact rolling bearing assemblies require the intermediate bearing ring to be captively arranged between the inner and outer bearing rings, and both the inner and outer bearing rings to be supported in machined bores in external components in which the angular contact rolling bearing assembly is being installed. Machining these bores in the external components is time consuming and adds an installation step.

Another known type of angular contact rolling bearing requires two separate bearing sub-assemblies, each sub-assembly including an inner bearing ring and an outer bearing ring with rolling elements therebetween. These angular contact rolling bearing assemblies are more expensive to manufacture than assemblies including a multi-race intermediate bearing rings due to the increased number of components. These assemblies are also heavier and require more space than other assemblies with a multi-race intermediate bearing ring because they include four bearing rings instead of three bearing rings.

SUMMARY

Briefly stated, a rolling bearing assembly including an intermediate bearing ring that is configured to be mounted to an external component is provided. The rolling bearing assembly includes an inner bearing ring including at least one axial end configured to be supported on a first component. An outer bearing ring is provided that includes at least one axial end configured to be supported on a second component. The intermediate bearing ring includes at least one axial end configured to be supported on a third component. The at least one axial end of the intermediate bearing ring extends in an axial direction past at least one of the at least one axial end of the inner bearing ring or the at least one axial end of the outer bearing ring. A first row of rolling elements is supported between the inner bearing ring and the intermediate bearing ring. The inner bearing ring includes a radially inner race on which the first row of rolling elements run, and the intermediate bearing ring includes a radially outer race on which the first row of rolling elements run. A second row of rolling elements is supported between the outer bearing and the intermediate bearing ring. The outer bearing ring includes a radially outer race on which the second row of rolling elements run, and the intermediate bearing ring includes a radially inner race on which the second row of rolling elements run.

BRIEF DESCRIPTION OF THE DRAWINGS

The foregoing Summary and the following detailed description will be better understood when read in conjunction with the appended drawings, which illustrate a preferred embodiment of the invention. In the drawings.

DETAILED DESCRIPTION OF THE PREFERRED EMBODIMENTS

Figure 1:
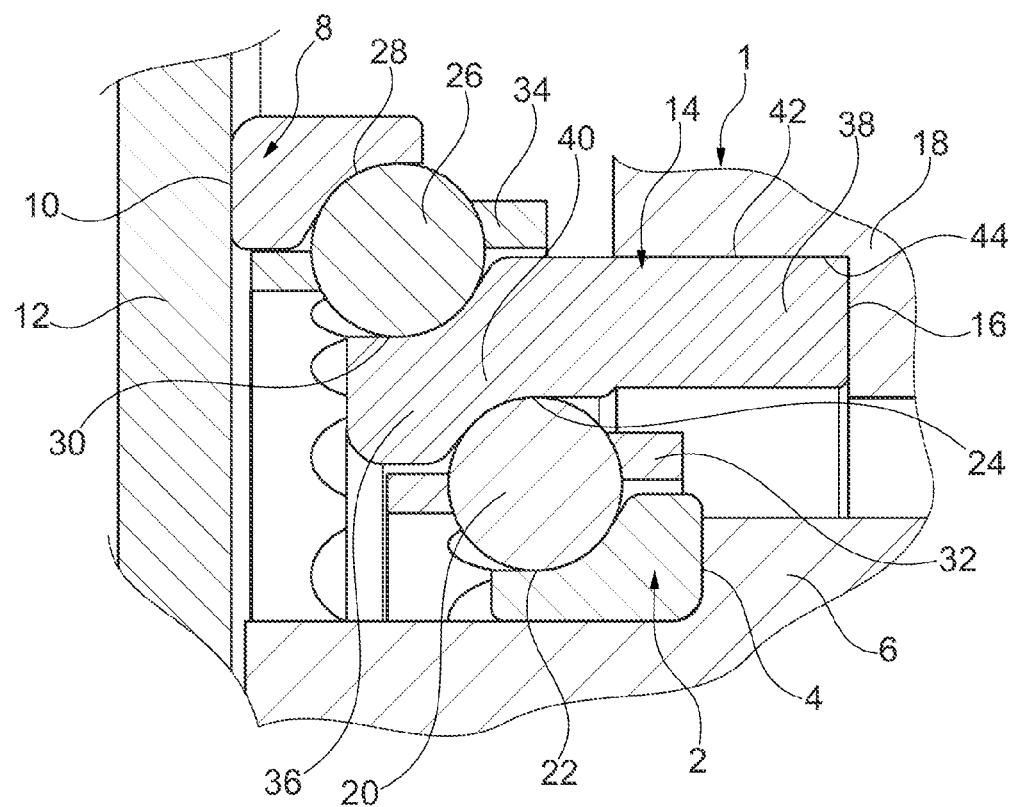
FIG. 1 is cross-sectional view through a rolling bearing including an intermediate bearing ring installed in an assembly in accordance with a preferred embodiment of the invention.

Certain terminology is used in the following description for convenience only and is not limiting. The words "front," "rear," "upper" and "lower" designate directions in the drawings to which reference is made. The words "radially inwardly" and "radially outwardly" refer to directions radially toward and away from an axis of the part being referenced. "Axially" refers to a direction along the axis of a shaft or other part. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Referring to FIGS. 1-4, a rolling bearing assembly 1 according to the present invention is shown. The rolling bearing assembly 1 includes an inner bearing ring 2 including at least one axial end 4 configured to be supported on a first component 6. An outer bearing ring 8 includes at least one axial end 10 configured to be supported on a second component 12. An intermediate bearing ring 14 includes at least one axial end 16 configured to be supported on a third component 18. The at least one axial end 16 of the intermediate bearing ring 14 extends in an axial direction past at least one of the at least one axial end 4 of the inner bearing ring 2 or the at least one axial end 10 of the outer bearing ring 8.

Figure 2:
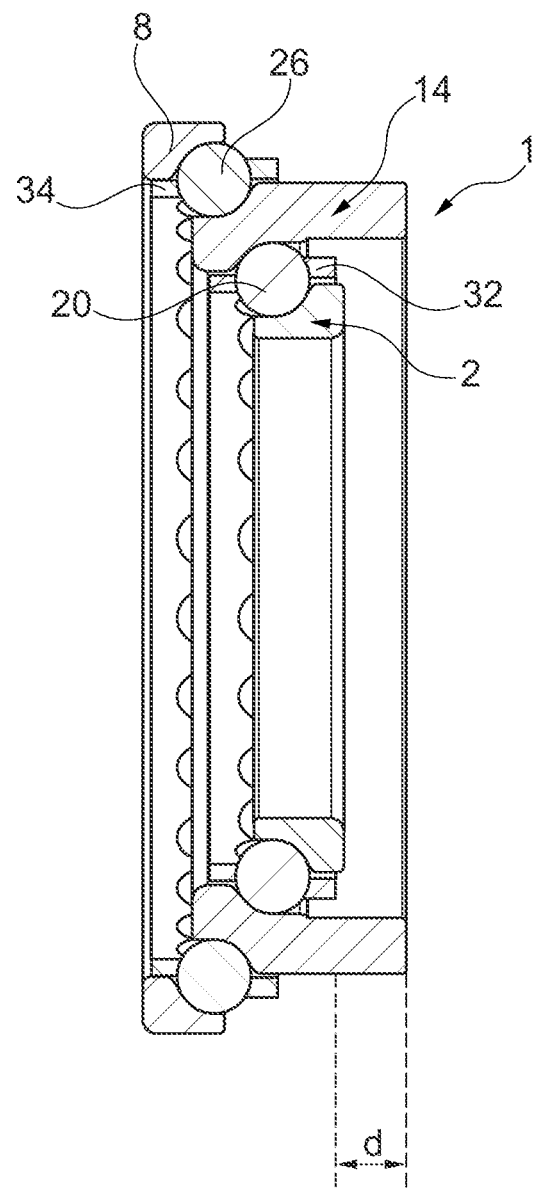
FIG. 2 is a cross-sectional view through the rolling bearing assembly shown in FIG. 1 in an uninstalled state.
Figure 3:
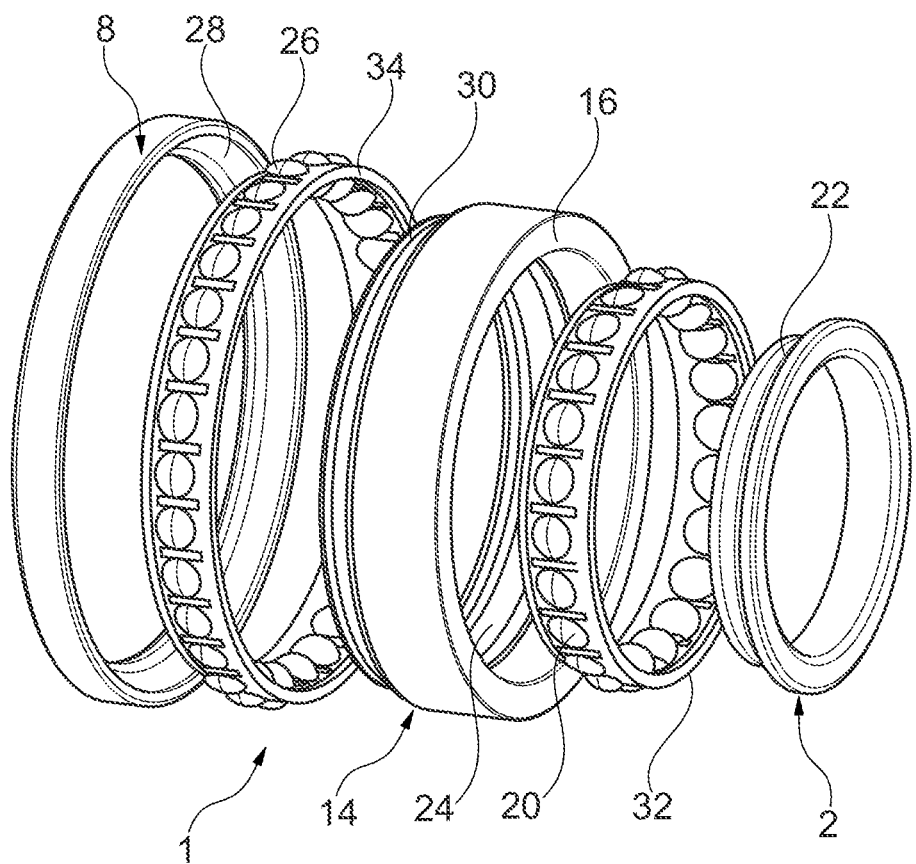
FIG. 3 is an exploded view of the rolling bearing assembly of FIGS. 1 and 2.

As shown in FIG. 2, the axial end 16 of the intermediate bearing ring 14 preferably extends past the axial end 4 of the inner bearing ring 2. In one preferred configuration, the axial end 16 of the intermediate bearing ring 14 preferably extends past the axial end 4 of the inner bearing ring 2 by a distance (d) that is sufficient to allow mounting of the intermediate bearing ring 14 on the third component 18 that is separate and apart from the first and second components 6, 12. Depending on the application, the axial end 16 of the intermediate bearing ring 14 can extend a greater or shorter distance past the axial end 4 of the inner bearing ring 2. One of ordinary skill in the art recognizes the opposite axial end of the intermediate bearing ring 14 could extend past the axial end 10 of the outer bearing ring 8 in an alternate embodiment of the present invention. The axial end of the intermediate bearing ring 14 that extends past the axial end of either the inner bearing ring 2 or the outer bearing 8 provides a mounting portion for installation in the third component. As shown in FIG. 1, a radially outer surface 42 of the second portion 38 of the intermediate bearing ring 14 is configured to be supported on a radially inner surface 44 of the third component 18. In another configuration, a radially inner surface of the first portion 36 of the intermediate bearing ring can be configured to be supported on a radially outer surface of the third component 18.

In one preferred configuration, the axial end 16 of the intermediate bearing ring 14 is fixed to the third component 18 by a press fit. This allows the inner bearing ring 2 and outer bearing ring 8 to be supported by the intermediate bearing ring 14. In another preferred configuration, the axial end 16 of the intermediate bearing ring 14 is fixed to the third component 18 by welding. One of ordinary skill in the art recognizes from the present disclosure that other mounting configurations, e.g. a flange formed on the intermediate bearing ring 14 and a complementary recess on the third component 18, can be used to install the rolling bearing assembly 1 with external components.

A first row of rolling elements 20 is supported between the inner bearing ring 2 and the intermediate bearing ring 14. The inner bearing ring 2 includes a radially inner race 22 on which the first row of rolling elements 20 run. The intermediate bearing ring 14 includes a radially outer race 24 on which the first row of rolling elements 20 run. A second row of rolling elements 26 is supported between the outer bearing ring 8 and the intermediate bearing ring 14. The outer bearing ring 8 includes a radially outer race 28 on which the second row of rolling elements 26 run. The intermediate bearing ring 14 includes a radially inner race 30 on which the second row of rolling elements 26 run. Each row of rolling elements 20, 26 is preferably comprised of spherical rolling elements. In a preferred configuration, a first cage 32 supports the first row of rolling elements 20, and a second cage 34 supports the second row of rolling elements 26.

As shown in FIG. 1, the radially inner race 30 of the intermediate bearing ring 14 is defined on a first portion 36 of the intermediate bearing ring 14, and the radially outer race 24 of the intermediate bearing ring 14 is defined on a second portion 38 of the intermediate bearing ring 14. In a preferred configuration, the first and second portions 36, 38, of the intermediate bearing ring 14 axially overlap at a transition portion 40. This overlap between the first portion 36 and the second portion 38, and the radially inner race 30 and the radially outer race 24, reduces the overall installation space required for the assembly 1.

Figure 4:
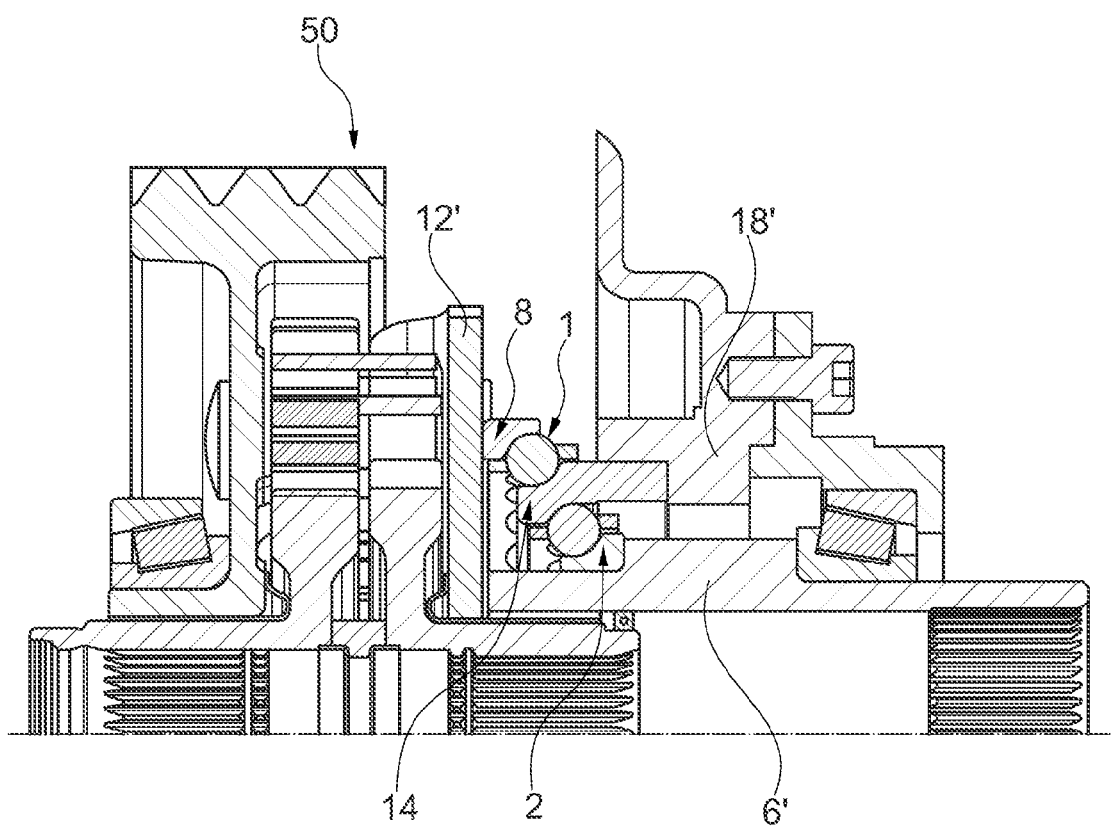
FIG. 4 is cross-sectional view through the rolling bearing of FIGS. 1-3 installed in a differential assembly.

As shown in FIG. 4, the rolling bearing assembly 1 can be installed in a differential assembly 50. The configuration shown in FIG. 4 is the same as FIGS. 1-3, except the rolling bearing assembly 1 is installed in the differential assembly 50 and the first component is an output shaft 6', the second component is a carrier plate 12', and the third component is a transmission housing 18'. One of ordinary skill in the art recognizes the rolling bearing assembly 1 can be adapted to be installed in various applications, while retaining the features described above.

Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

LIST OF REFERENCE ELEMENTS

1. Rolling bearing assembly
2. Inner bearing ring
4. Axial end of inner bearing ring
6. First component
6'. Output shaft
8. Outer Bearing Ring
10. Axial end of outer bearing ring
12. Second component
12'. Carrier plate
14. Intermediate bearing ring
16. Axial end of intermediate bearing ring
18. Third component
18'. Transmission housing
20. First row of rolling elements
22. Radially inner race on inner bearing ring
24. Radially outer race on intermediate bearing ring
26. Second row of rolling elements
28. Radially outer race on outer bearing ring
30. Radially inner race on intermediate bearing ring
32. First cage
34. Second cage
36. First portion of intermediate bearing ring
38. Second portion of intermediate bearing ring
40. Transition portion of intermediate bearing ring
42. Radially outer surface of second portion of intermediate bearing ring
44. Radially inner surface of third component
50. Differential assembly

What is claimed is:

1. A differential assembly including a rolling bearing assembly, the rolling bearing assembly comprising:

an inner bearing ring including at least one axial end configured to be supported on a first component;

an outer bearing ring including at least one axial end configured to be supported on a second component;

an intermediate bearing ring including at least one axial end configured to be supported on a third component, wherein the at least one axial end of the intermediate bearing ring extends in an axial direction past at least one of the at least one axial end of the inner bearing ring or the at least one axial end of the outer bearing ring;

a first row of rolling elements supported between the inner bearing ring and the intermediate bearing ring, the inner bearing ring includes a radially inner race on which the first row of rolling elements run, and the intermediate bearing ring includes a radially outer race on which the first row of rolling elements run; and a second row of rolling elements supported between the outer bearing ring and the intermediate bearing ring, the outer bearing ring includes a radially outer race on which the second row of rolling elements run, and the intermediate bearing ring includes a radially inner race on which the second row of rolling elements run, wherein the first component is an output shaft, the second component is a carrier plate, and the third component is a transmission housing.

2. The differential assembly of claim 1, further comprising a first cage for supporting the first row of rolling elements, and a second cage for supporting the second row of rolling elements.

3. The differential assembly of claim 1, wherein the radially inner race of the intermediate bearing ring is defined on a first portion of the intermediate bearing ring, and the radially outer race of the intermediate bearing ring is defined on a second portion of the intermediate bearing ring, and the first and second portions of the intermediate bearing ring axially overlap at a transition portion of the intermediate bearing ring.

4. The differential assembly of claim 1, wherein the at least one axial end of the intermediate bearing ring is fixed to the third component.

5. The differential assembly of claim 4, wherein the at least one axial end of the intermediate bearing ring is fixed to the third component by a press fit.

6. The differential assembly of claim 4, wherein the at least one axial end of the intermediate bearing ring is fixed to the third component by welding.

7. The differential assembly of claim 1, wherein the first and second components are supported via the intermediate bearing ring on the third component.

\* \* \* \* \*